UNITED STATES PATENT OFFICE.

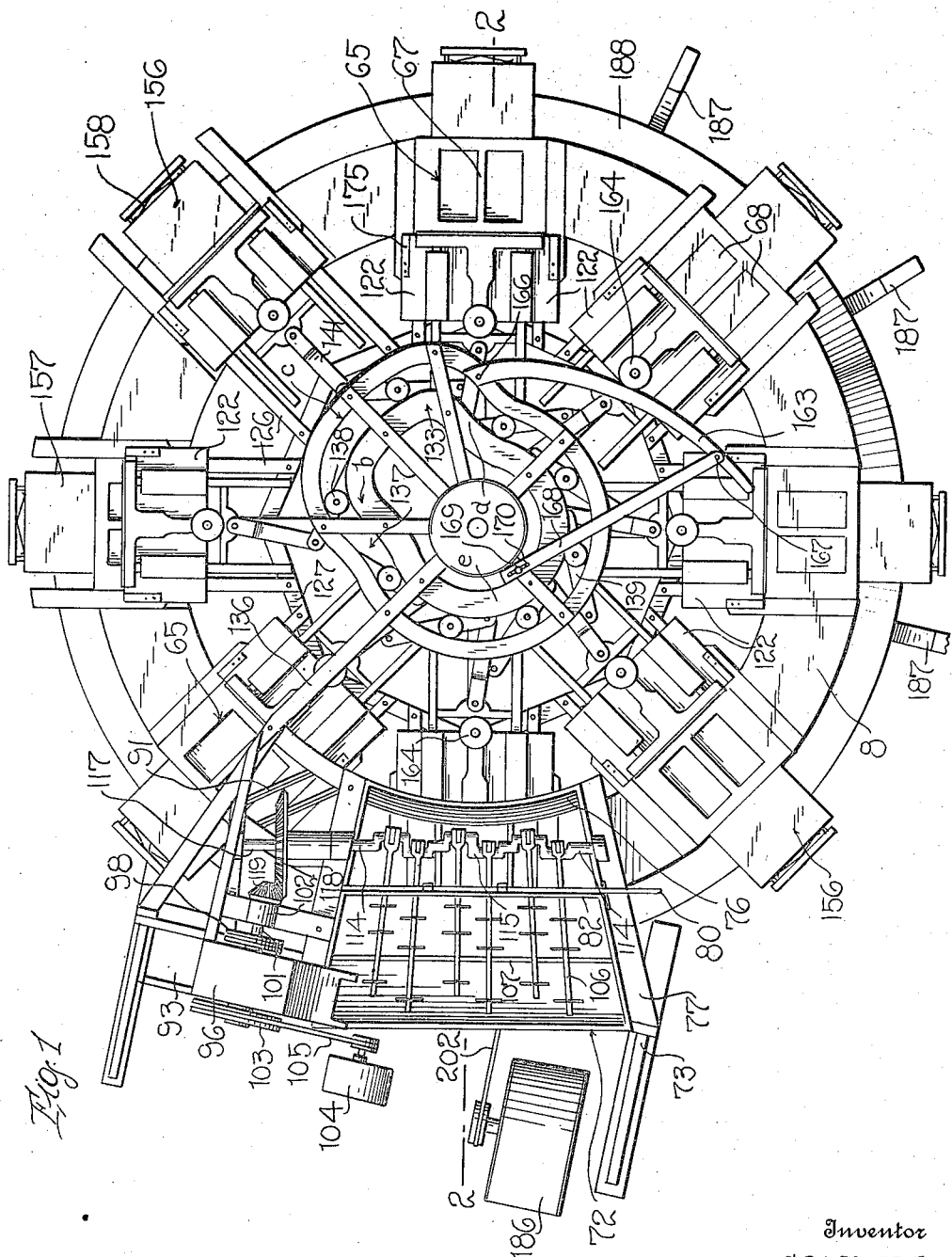

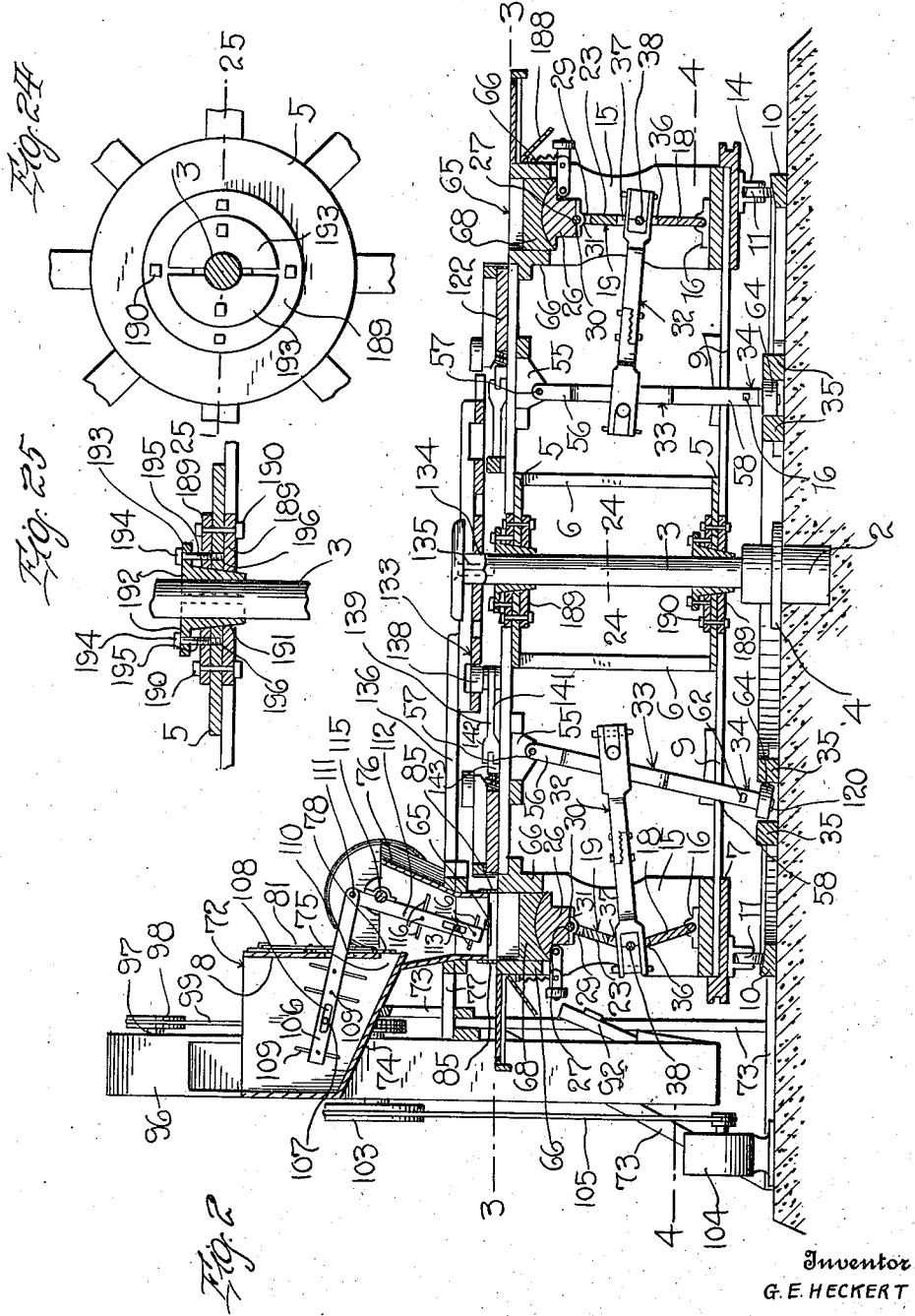

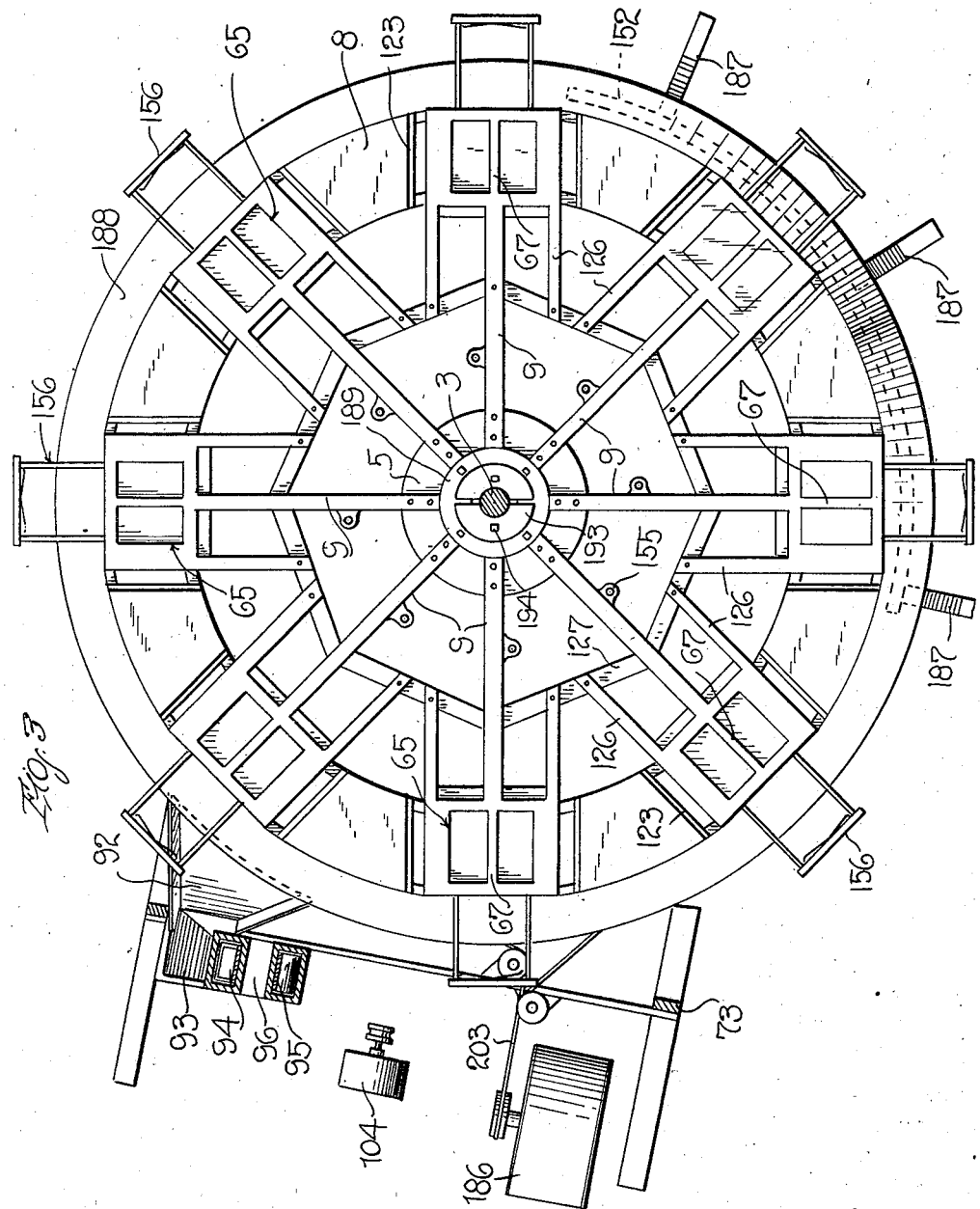

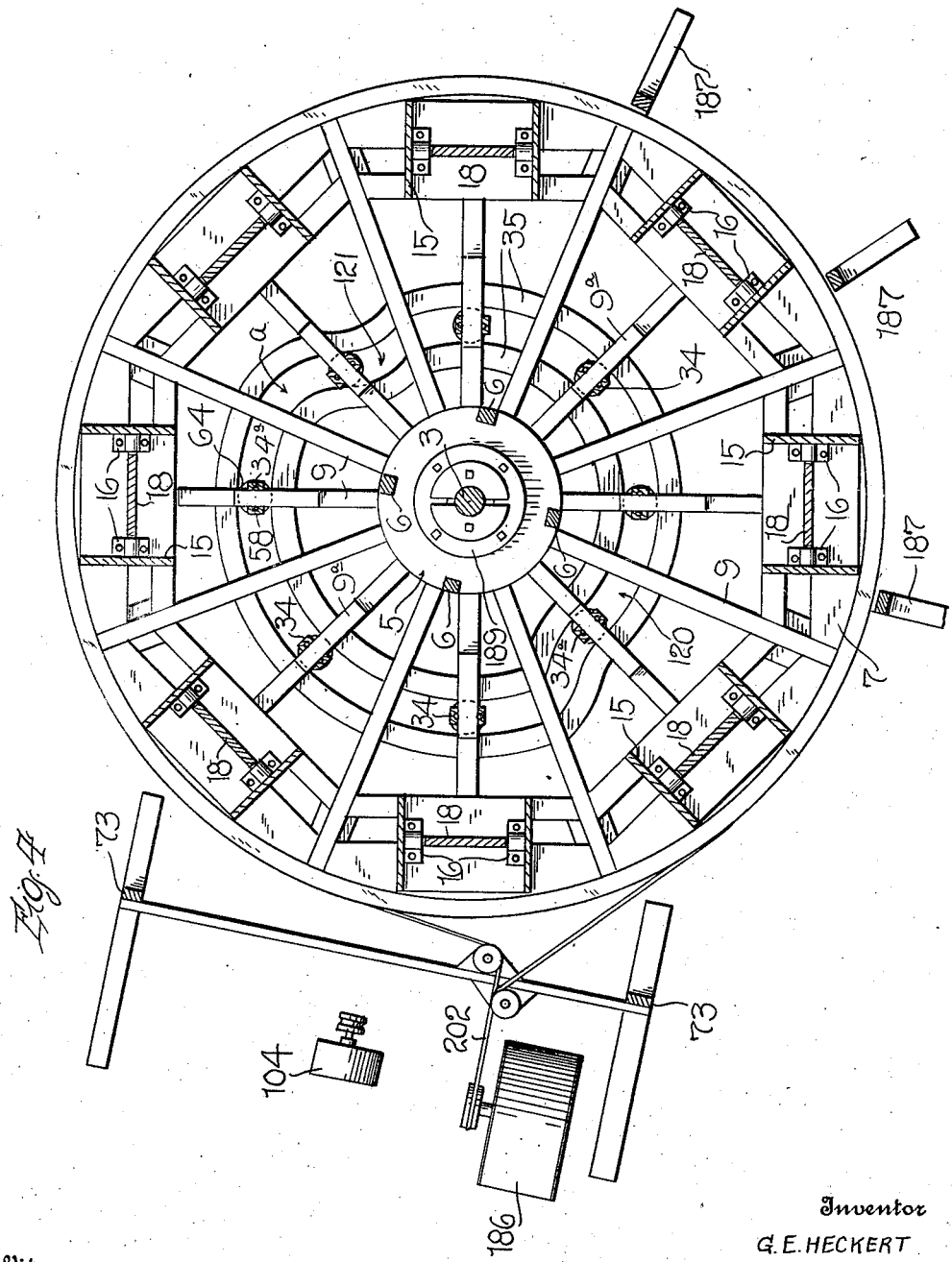

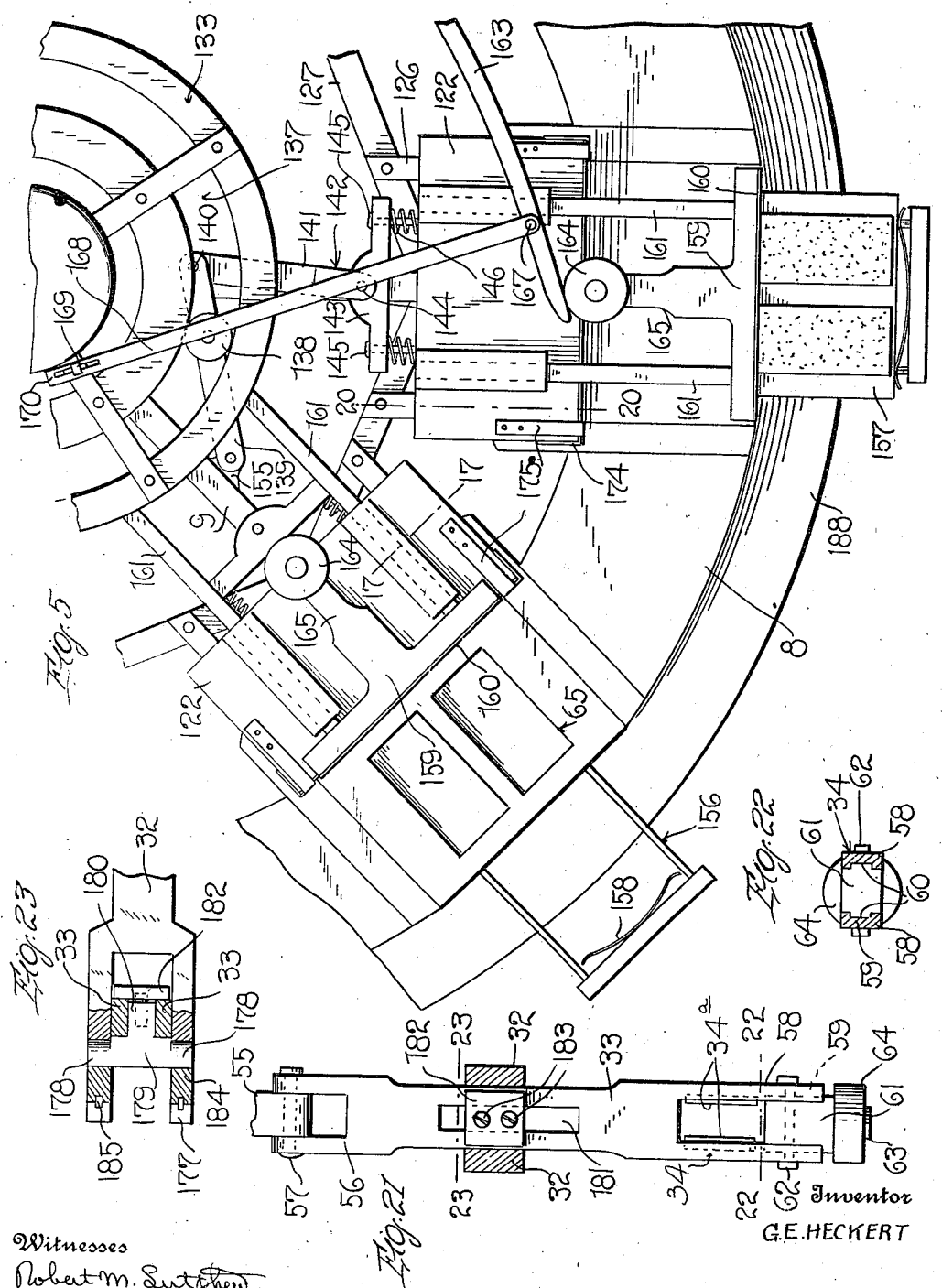

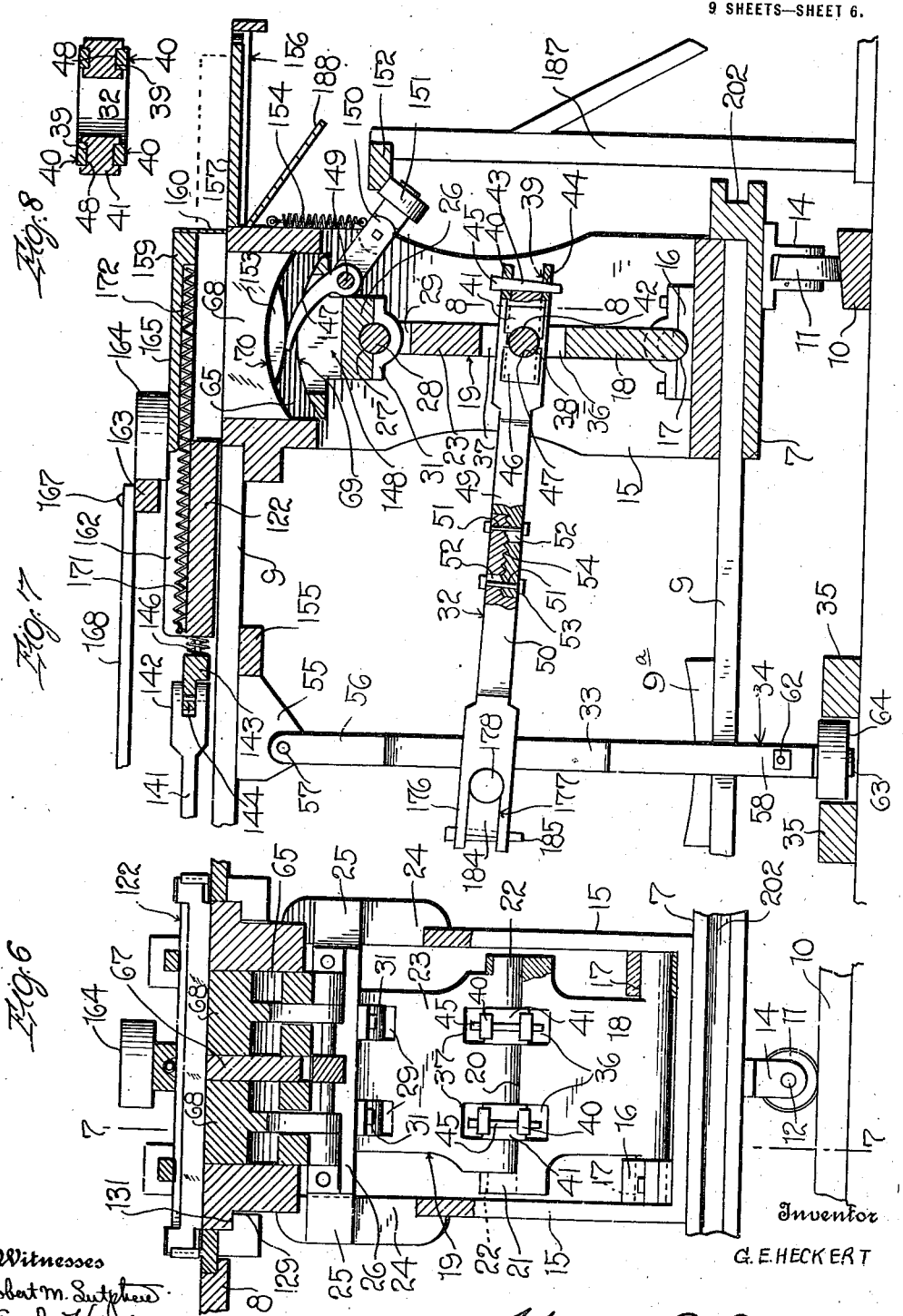

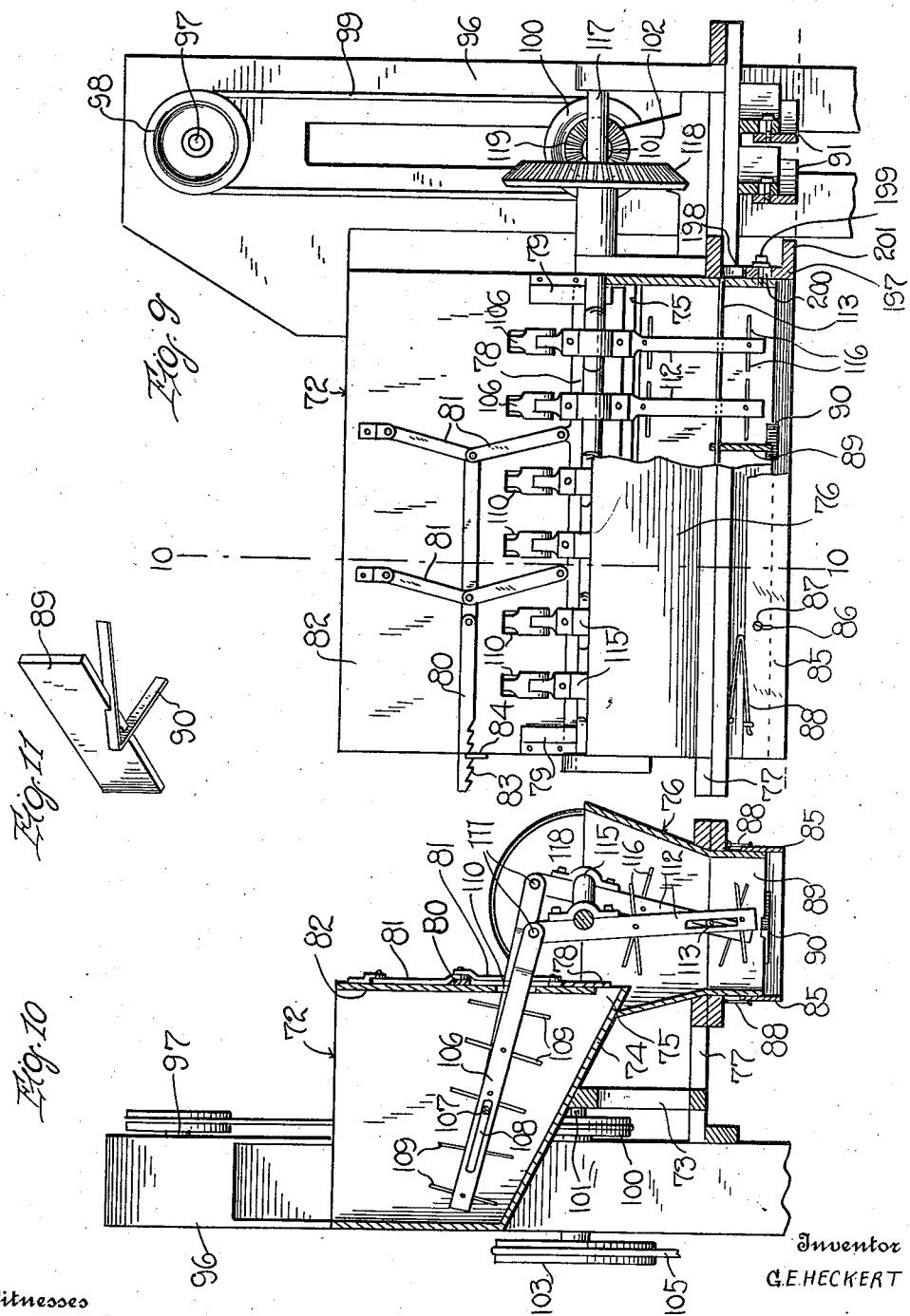

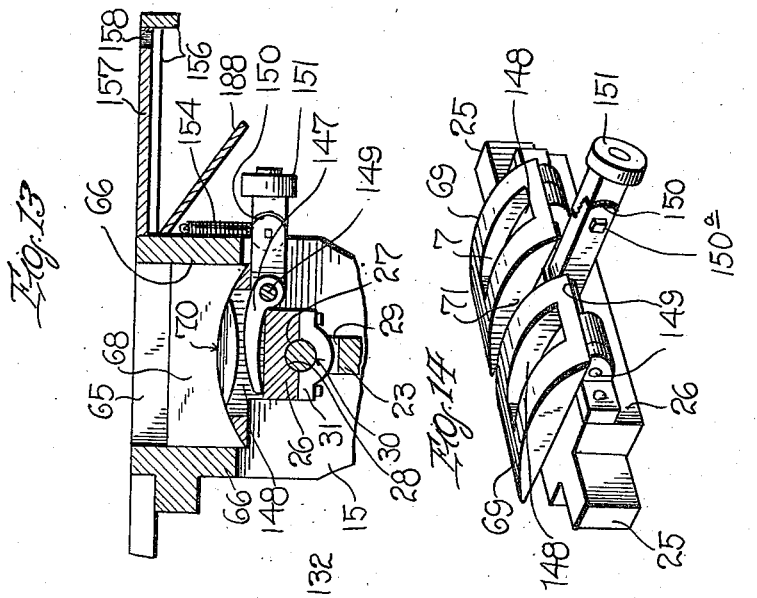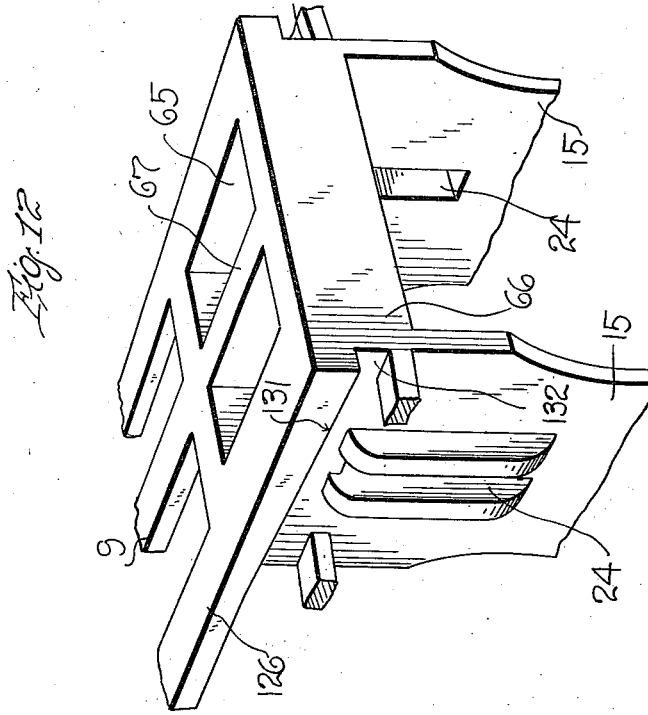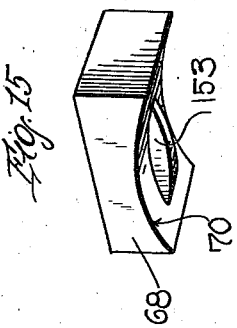

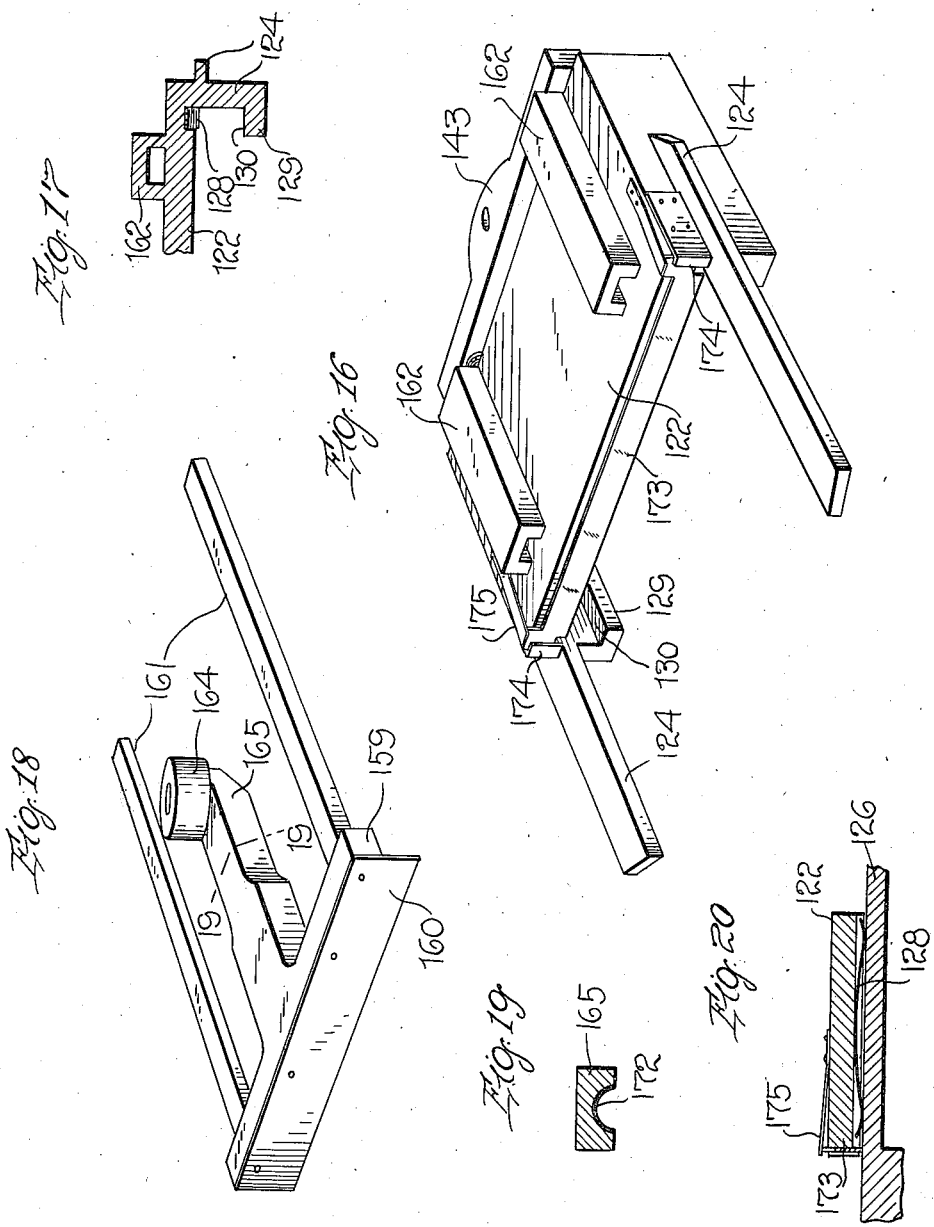

GEORGE EMORY HECKERT, OF PORT ROYAL, PENNSYLVANIA.

MOLDING APPARATUS.

1,139,971.  Specification of Letters Patent.  Patented May 18, 1915.

Application filed November 3, 1913. Serial No. 798,958.

*To all whom it may concern:*

Be it known that I, GEORGE EMORY HECKERT, a citizen of the United States, residing at Port Royal, in the county of Juniata and State of Pennsylvania, have invented certain new and useful Improvements in Molding Apparatus, of which the following is a specification, reference being had to the accompanying drawings.

This invention relates to certain improvements in molding apparatus and has relation more particularly to a device of this general character especially designed and adapted for use in connection with the production of bricks or the like and an object of the invention is to provide a device of this general character of a simple and comparatively inexpensive nature having means of a novel and improved character whereby the bricks or the like are produced in substantially an automatic manner.

The invention also has for its object to provide a device of this character having novel and improved means wherein a plurality of mold members are employed movable about a common axis and relatively to a fixed source of supply.

The invention furthermore has for an object to provide a device of this general character including novel and improved means whereby a brick or the like after being molded is ejected in such a manner as to be collected without interruption to the operation of my improved device and without injury to the brick or the like thus ejected.

It is a further object of the invention to provide a device of this general character including means of a novel and improved character whereby the material to be operated upon is properly distributed within its mold and whereby substantially all surplus material delivered to such mold will be collected and returned to the source of supply.

The invention also has for an object to provide a novel and improved device of this general character including a plurality of continuously traveling molds having coacting therewith reciprocable plungers operable upon travel of the molds.

The invention also comprehends the inclusion of a delivery means of a novel and improved character having as a part thereof an agitating mechanism serving, in addition to maintaining the proper mixture of the material to be molded, to force such material within the molds when such molds are brought into proper position relatively to the delivery means.

The invention consists in the details of construction and in the combination and arrangement of the several parts whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view in top plan of a molding apparatus constructed in accordance with an embodiment of my invention; Fig. 2 is a sectional view taken substantially on the line 2—2 of Fig. 1, the parts rearwardly of the plane of section being omitted for distinctiveness of disclosure; Fig. 3 is a sectional view taken substantially on the line 3—3 of Fig. 2; Fig. 4 is a sectional view taken substantially on the line 4—4 of Fig. 2; Fig. 5 is an enlarged fragmentary view in top plan of a portion of my improved molding apparatus, as herein disclosed, and illustrating certain parts of the invention in detail; Fig. 6 is an enlarged fragmentary vertical sectional view illustrating in detail the concomitant parts of a mold proper; Fig. 7 is a sectional view taken substantially on the line 7—7 of Fig. 6; Fig. 8 is a sectional view taken on the line 8—8 of Fig. 7; Fig. 9 is a view in front elevation and partly in section of the feeding mechanism, as herein embodied; Fig. 10 is a sectional view taken on the line 10—10 of Fig. 9; Fig. 11 is a view in perspective, detached, of a part of the mechanism disclosed in Figs. 9 and 10; Fig. 12 is a fragmentary view in perspective of a mold proper, as herein set forth; Fig. 13 is a transverse vertical section taken through Fig. 12, illustrating certain details of the compressing apparatus; Fig. 14 is a perspective view, detached, of a part of my invention, as illustrated in Fig. 13; Fig. 15 is a perspective view, detached, of a pallet set forth in Fig. 13; Fig. 16 is a view in perspective, detached, of the slide or movable pallet herein embodied; Fig. 17 is a sectional view taken on the line 17—17 of Fig. 5; Fig. 18 is a view in perspective, detached, of the transfer member, as herein embodied; Fig. 19 is a sectional view taken on the line 19—19 of Fig. 18; Fig. 20 is a sectional view taken on the line 20—20 of Fig. 5; Fig. 21 is an enlarged fragmentary view in elevation, with a part in section, illustrating a further detail of my invention, as herein set forth; Fig. 22 is a sectional view taken on the line 22—22 of Fig. 21; Fig. 23 is a sectional view taken on the line 23—23 of Fig. 21; Fig. 24 is a sectional view taken on the line 24—24 of Fig. 2; and Fig. 25 is a sectional view taken substantially on the line 25—25 of Fig. 24.

As disclosed in the accompanying drawings, 1 denotes a foundation of any ordinary or preferred configuration and produced of any desired material but herein indicated as formed from concrete and in which is suitably anchored a bearing 2 adapted to serve as a mounting for the lower end portion of the vertically disposed shaft 3 of such dimensions as the requirements of practice may dictate. As herein disclosed, the upper end portion of such bearing 2 is projected above the uppermost surface of the foundation 1, and is provided with the outwardly directed annular flange 4 bearing against such upper surface of the foundation 1 and whereby it will be readily perceived that an effective means is afforded whereby such bearing 2 is maintained against lateral displacement, as would otherwise tend to throw the shaft 3 out of the perpendicular. Freely rotatable about the shaft 3 and in predetermined spaced relation are the hub disks 5 tied or united by the vertically disposed elongated members or bars 6, whereby such hub disks 5 are maintained in their proper spaced relation and caused to have axial movement about the shaft 3 in unison. Concentric to the shaft 3 and in alinement with the hub disks 5 are the annular upper and lower platforms or shelves 7 and 8 respectively, such platforms being operatively connected with the disks 5 through the medium of the radiating spokes or arms 9. The relative positions of the platforms or shelves 7 and 8 with the shaft 3 is dependent upon the number of molds, to be hereinafter more particularly referred to, which may be employed which is believed to be self-evident to those skilled in the art to which my present invention appertains.

Concentric with the shaft 3 and positioned beneath the lower platform or shelf 7 is an annular track-way 10 on which is adapted to travel the wheels 11 mounted on the horizontally disposed shafts 12 suitably supported in the bearings 14 secured to the under surface of such lower platform or shelf 7, whereby it will be readily perceived that suitable supporting means is afforded for the marginal portions of the frame created by the platforms or shelves 7 and 8 and whereby axial movement thereof may be had with a minimum of friction.

In order to maintain the platforms or shelves 7 and 8 in proper spaced relation or in alinement with the hub disks 5, hereinbefore referred to, I interpose between such platforms or shelves at predetermined intervals a pair of partitions or walls 15 in spaced relation and disposed in parallelism with the vertical plane passing centrally therebetween radiating from the axial center of the frame. Between each pair of the partitions or walls 15 and projecting upwardly from the lower platform or shelf 7 and preferably in close proximity to each of such walls is a bearing 16 in which is rotatably mounted a trunnion 17 projecting laterally from the lower end portion of the undermost section 18 of a toggle member 19. The upper longitudinal portion of the section 18 of the toggle member is recessed, as at 20, with the base thereof concaved transversely, such recessed portion affording the upstanding ears or lugs 21 adapted to serve in any conventional manner as a bearing for the laterally directed trunnions 22 projecting from the sides of the lowermost portion of the upper section 23 of such toggle member 19, the adjacent longitudinal marginal portion of such section 23 being convexed whereby the same projects into and is snugly accommodated by the concaved base portion of the recess 20.

The upper portions of the partitions or walls 15 are provided with the elongated longitudinally disposed slots 24 arranged in horizontal alinement and through which is adapted to extend the extensions or tongues 25 projecting lengthwise from the opposite ends of the head or block 26, whereby it will be readily perceived that such head or block 26 will be capable of recurrent movement in a fixed path of travel in a vertical plane.

At substantially its transverse center and extending longitudinally thereacross, the under surface of the head or block 26 is provided with a groove or channel 27 concaved transversely and into which is adapted to project and be snugly accommodated therein the correspondingly convexed upper end portion 28 of the upper section 23 of the toggle member 19. Such upper end portion of the section 23 has produced therein the apertures or openings 29, the upper wall whereof is formed as to have its periphery in such continuity with the convexed portion of such section as to afford shaft sections 30 circular in cross section and which are adapted to be bridged by the bearing blocks 31 whereby such upper section 23 is hingedly connected to such head or block 26.

In view of the foregoing it is thought to be obvious that by exerting pressure or pull upon the toggle sections 18 and 23 at their pivotal connection or knuckle that such head or block 26 will be caused to travel either upwardly or downwardly and, as disclosed in the present embodiment of my invention, I effect this operation through the medium of the pitman 32 having its outer end portion in pivotal engagement with the toggle member 19 at the axis of connection between the sections 18 and 23, whereby recurrent movement imparted to the pitman 32 will result in equal movement to each of such toggle sections. The inner end portion of the pitman 32 is in pivotal engagement with a lever 33 herein disclosed as depending from a spoke 9 radiating from the upper hub disk 5 and disposed in a vertical plane central of the partitions or walls 15, such lever being in pivotal engagement with such spoke and of such a length as to have its lowermost extremity 34 coacting with a cam element 35 fixedly mounted upon the foundation 1. The particular arrangement and configuration of this cam element will be more particularly referred to hereinafter.

As disclosed in the present embodiment of my invention, the connection between the pitman 32 and the toggle member 19 is afforded by producing in the upper marginal portion of the lower section 18 the elongated longitudinally disposed open ended slots 36 which are in alinement with the elongated vertically disposed perforations 37 produced in the upper section 23, the lower marginal portion 38 of the section 23 adjacent the perforations 37 serving as shaft members adapted to be passed through the open ended slots 39 produced in the forks 40 of the bifurcated end of the pitman 32. After the portions 38 have been properly positioned within the slots 39, the ends thereof are closed by the blocks 41 the inner face 42 of each of which is concaved transversely to bear snugly against the portions 38, while the outer or opposite end face thereof is grooved vertically, as at 43, and adapted to register with suitable openings 44 produced in the extremities of the forks 40 and adapted to accommodate the longitudinal marginal portions of the keys or wedges 45, whereby such blocks will be effectively held against displacement and the pitman 32 effectively coupled to the toggle member 19. Coacting with the blocks 41 and positioned at the base of the kerfs afforded by the forks 40 are the inner blocks 46, each of which is provided with a suitable groove or channel 47 to accommodate the portions 38 whereby it will be readily perceived that an effective mounting is afforded and permitting a ready and convenient adjustment to take up any resultant wear that may be had upon the blocks. It is also to be observed that in order to prevent displacement of such blocks from between the forks 40, I provide in the side faces thereof the grooves 48 adapted to accommodate the adjacent portions of such forks in a manner which is believed to be clearly apparent.

The depth of the brick to be molded is determined by the length of the pitman 32 and it will therefore be obvious that such extent of travel may be regulated or controlled with convenience by producing such pitman 32 of a plurality of sections capable of relative adjustment and, as herein set forth, the pitman 32 comprises the sections 49 and 50 having their adjacent end portions reduced in thickness in such a manner as to permit a convenient overlapping of the same, such overlapping portions being provided with the registering apertures 51 and 52, the apertures 52 being in the nature of elongated slots whereby it will be readily perceived that the clamping members 53 may be employed with facility for holding such sections 49 and 50 in their relatively adjusted positions, the elongated apertures or slots 52, as is believed to be obvious, readily permitting the requisite adjustment. While in no wise imperative, I have found it best to have the openings 52 in one of the sections adapted for register with the openings or apertures 51 in the second section as by this arrangement I have found that the requisite adjustment may be maintained with greater effectiveness.

In view of the fact that the pitman 32 constitutes an essential element for the successful operation of the device, as herein disclosed, it is necessary to be assured that the adjustment of the sections 49 and 50 thereof be positive. While I have found that the clamping members 53 operate with facility I provide an additional means which is herein disclosed as rack sections 54 positioned on opposed faces of the overlapping portions of the sections 49 and 50 and which are adapted to intermesh, the extent of such rack sections 54 being such as to assure such intermesh irrespective of the adjustment of the sections 49 and 50 as afforded by the elongated apertures or slots 52.

While the pivotal connection between the lever 33 and the coacting spoke or arm 9 may be of any ordinary character, I prefer to provide such spoke or arm 9 with a depending perforate ear 55 which is adapted to be bridged or straddled by the bifurcated upper extremity of the lever 33, the forks 56 thereof being provided with suitable apertures or perforations adapted to be brought into register with the perforate ear 55 to permit the passage therethrough of a suitable pintle 57 of any ordinary or preferred construction but preferably a headed pintle, with the free extremity adapted to be either engaged by a suitable nut or bur or to be upset. Either of these arrangements is well known and it is not believed that a further detail thereof need be given. The lower extremity of the lever 33 is also bifurcated whereby forks 58 of requisite length are afforded which are adapted to straddle a spoke or arm 9 radiating from the lower hub disk 5 and in vertical alinement with the spoke or arm 9 to which the lever is pivotally connected and with which such forks are adapted to contact whereby it will be readily perceived that a convenient and efficient means is provided whereby such lever 33 is held against undue lateral displacement, as would otherwise materially interfere with the successful performance of its functions.

The adjacent faces of the extremities of the forks 58 are provided with the longitudinally directed mortises 59 adapted to accommodate the elongated tenons or tongues 60 produced on the opposite side faces of a block 61 adapted to be interposed between such forks 58, whereby it will be seen that such block is effectively held in operative position, although I find it of advantage to direct through such forks 58 and the block 61 an anchoring member 62 herein disclosed as a conventional bolt. Depending from the lower face of the block 61 is a stub shaft 63, on which is loosely mounted an anti-friction roller 64 adapted to contact with the cam element 35, hereinbefore referred to, whereby resultant friction between the lever 33 and such cam element 35 is substantially eliminated.

The upper platform or shelf 8 has afforded therein above the space between each pair of partitions or walls 15 an opening 65, herein disclosed as substantially rectangular in form, and having depending from the opposite longitudinal walls thereof the flanges 66 which extend entirely across the space between the partitions or walls 15 and are of a predetermined width and serve as the side walls for a mold compartment, the adjacent portions of the side walls or partitions 15 serving to afford the remainder of such walls. I wish to particularly state at this time that I do not desire to be limited to any particular configuration of mold as it is thought to be obvious that the same may be of any style required. As herein disclosed, the mold, as hereinbefore set forth, is divided into a plurality of compartments through the medium of the intermediate partition 67.

The pallets 68 for the compartments of the mold are capable of movement therein in a vertical plane and are supported by the head or block 26, the upper surface of which block at its end portions being convexed, as indicated at 69, each of which convexed portions is adapted to be accommodated within the concaved under face 70 of the pallet 68, the intermediate portion of the head or block 26 being grooved, as at 71, to receive the lower marginal portion of the partition 67. Further reference will be had to the pallets 68 hereinafter.

The material to be molded may be delivered within the mold in various ways but I prefer to employ the feeding or delivery means constructed in accordance with an embodiment of my invention and, as herein disclosed, such means includes a hopper 72 of a predetermined capacity into which the material to be molded may be discharged in any convenient manner, such hopper 72 being termed for convenience the source of supply of the material to be operated upon. The hopper 72 is positioned in a plane above the shelf or platform 8 and is suitably supported in its proper position by a supporting frame 73, such supporting frame 73 being suitably anchored to the foundation 1. The bottom wall 74 of the hopper is inclined downwardly and in a direction toward the revoluble frame, while the lower marginal portion of the forward face thereof is open, as at 75, through which the material therein is adapted to be passed into the auxiliary or feeding hopper 76, such hopper 76 being positioned directly above the upper shelf or platform 8 and in close proximity thereto and of a substantially segmental form in order to be disposed in proper relation relatively to such shelf or platform. The auxiliary or feeding hopper 76, while suitably secured to the adjacent portion of the supply hopper 72, is additionally supported and maintained in proper position through the medium of the forwardly directed arms or brackets 77 carried by the supporting frame 73. The manner in which the auxiliary hopper is supported forms no particular part of my present invention and a detailed description thereof is believed to be unnecessary. The passage of material from the supply hopper 72 to the auxiliary or feeding hopper 76 is under control of the gate or valve 78 which is capable of operation to control the opening 75, hereinbefore referred to; and, as herein set forth, such gate or valve 78 is capable of vertical movement and is maintained in a proper path of travel through the medium of the guide straps 79. While the necessary recurrent movement may be imparted to such gate or valve in various ways, I find it of particular advantage to employ the endwise movable member 80 disposed substantially horizontal and in proper pivotal engagement with the toggles 81 which, in turn, are pivotally engaged with the upper longitudinal marginal portion of the gate or valve 78 and with the forward wall 82 of the supply hopper 72. In order to maintain the gate or valve 78 in its adjusted positions the elongated member 80, as herein set forth, is provided in its under edge with a plurality of notches 83 adapted to coact with a suitable latch 84 carried by the hopper 72 at a convenient location thereon. The extent of the auxiliary or feeding hopper 76 is materially greater than the length of the mold, hereinbefore referred to, so that as such mold is caused to travel beneath such hopper 76 it is assured that the requisite material will be delivered thereto.

In order to create a requisite contact with the upper shelf or platform 8 to prevent the material being delivered through the auxiliary or feeding hopper 76 from escaping laterally, I provide the lower marginal portions of the side walls of such auxiliary or feeding hopper 76 with the yieldingly mounted sections 85 which are adapted to contact with the upper surface of such shelf or platform 8 and, as herein embodied, such sections have in their upper marginal portions a plurality of vertically directed elongated slots 86 through which project the outer extremities of the headed members 87 suitably anchored to the adjacent walls of such hopper 76 and in contact with the upper edge portions of such sections 85 are suitable expansion members 88, such members being also suitably secured to the hopper 76 whereby it will be perceived that such sections 85 will be maintained substantially constantly in contact with the upper surface of the table or platform 8.

In order to assure proper distribution of the material within the mold passing thereunder, I provide, as set forth in my present embodiment, a plurality of transverse beams 89 intersecting the open lower face of the hopper 76 and to each of which is suitably affixed the rearwardly directed spreading member 90 herein shown as substantially V-shaped in form and whereby it will be obvious that the material deposited within the mold will be distributed throughout.

In order to assure the proper quantity of material being delivered to the mold, it is to be observed that that portion of the hopper 76 directly thereabove is spaced therefrom to such an extent as to assure the material to be in excess of the capacity of the mold and in order to assure removal of this surplus material before the molding operation proper takes place, I find it of advantage to extend transversely across the line of travel of such mold and preferably on an incline the scraper members 91, the inclination of such members being such as to cause the surplus material removed thereby to travel in a direction toward the periphery of the upper member or platform 8 and in order that such surplus material will not constitute waste I position in proper relation to such scraper members 91 a chute 92 which is adapted to receive such material as scraped or wiped from above the mold, and which chute is adapted to deliver within a suitable hopper 93, the discharge end of which is intersected by the buckets 94 included in the vertically directed conveyer 95 which conveyer is of such construction and arrangement as to return such surplus material to the supply hopper 72, whereby the same may be again delivered to a mold passing beneath the hopper 76. As the conveyer 95 in itself forms no particular part of my invention, as herein embodied, it is believed that a detailed description thereof is unnecessary other than to state that the stretches of such conveyer are inclosed within a suitable casing 96 whereby there will be no indiscriminate scattering of such surplus material during its return to the supply hopper 72. It might also be well to further state that the conveyer 95 passes around suitable rollers operatively mounted in the casing 96, the uppermost of such rollers having its shaft 97 extended exteriorly of the casing 96 and having suitably affixed to such extended portion a pulley 98 around which is passed a belt 99 which, in turn, is passed around a second pulley 100 affixed to a shaft 101 suitably mounted in the bearings 102 carried by the casing 96 and the supporting frame 73. The outermost portion of such shaft 101 has affixed thereto a second pulley 103 which is adapted as herein set forth, to be operatively connected with a suitable source of power, as indicated at 104, by a belt 105.

While it is to be understood that my invention, as herein set forth, may be employed with facility in the production of bricks or the like formed of differing materials, it is especially designed for the production of silica bricks which are produced from a plastic composition comprising a plurality of differing ingredients. I have therefore found it desirable for the best results to position within the hopper 72 a mechanism capable of operation to keep the composition therein agitated during the period that the apparatus is in use, whereby the proper admixture of such composition is maintained, and, as herein disclosed, I accomplish this agitation within the hopper 72 through the medium of a plurality of rock arms 106 extending transversely of such hopper 72 and being suitably mounted intermediate their length upon the shaft 107 extended longitudinally of such hopper 72 and suitably affixed in the end walls thereof. This shaft is mounted for non-rotation and the rock arms 106 are therefore loosely in engagement therewith in order that they may be capable of their requisite movements and for this purpose each of such rock arms is provided intermediate its length with an elongated longitudinally directed slot 108 through which such shaft 107 projects as and for a purpose which is believed to be self-evident. I also find it of advantage that such arms 106 be angular in cross section and to have projecting substantially perpendicularly from each of the faces thereof the elongated teeth 109, these teeth or projections 109 being as desired. The rock arms 106 extend exteriorly of the hopper 72 through the openings 110 produced in the forward wall thereof and have their outer end portions in pivotal engagement, as at 111, with the substantially vertical rock arms 112 pivoted at their lower end portions to a suitable shaft 113 extended longitudinally of such hopper and mounted for non-rotation in the end walls thereof. In the upper marginal portion of the end walls of such auxiliary or feeding hopper 76 and axially in alinement with the shaft 113 is the crank shaft 114, such shaft being provided with a crank for each of the rock arms 112 and being operatively engaged therewith, as at 115, the adjacent cranks being offset one relatively to the other, so that upon rotation of the shaft 113 it is assured that the rock arms 106 and 112 while operating in unison are traveling in differing directions whereby is assured a complete agitation of the composition both within the hopper 72 and the hopper 76. The arms 112 are also angular in cross section and having projecting from their faces and substantially perpendicularly thereto, the teeth 116. In addition to affording a means for agitating the composition in order to maintain the proper admixture of the ingredients, such arms 106 and 112 serve as a means for assuring the requisite travel of the composition from the hopper 72 to within the hopper 76 and from the hopper 76 to within a mold passing thereunder.

While the shaft 114 may be caused to rotate in any manner which will operate with convenience and facility, I find it of particular advantage to have one end portion of such shaft projected, as at 117, and to which projected portion is affixed a suitable gear wheel 118 adapted to mesh with a pinion 119 carried by the inner end portion of the shaft 101.

The anti-friction roller 64, hereinbefore referred to, rides within the cam race 120 afforded in the cam element 35 and at the time the mold is passing below the auxiliary or feeding hopper 76 such cam race is disposed concentrically to the shaft 3 and in such relation thereto as to maintain the lever 33 in such adjustment as to maintain the head or block 26 and the pallets 68 in their lowermost position within the mold and maintains the same in such position until the mold frame has been rotated a predetermined distance, or to a point as indicated by $a$ in Fig. 4, whereupon the cam race is afforded with a somewhat abrupt low point 121 which results in such movement being imparted to the sections of the toggle member 19 as to impart upward movement to the head or block 26 and the pallets 68 thereon, the upward stroke of the head or block 26 affording the requisite pressure to properly mold or compress the material within the mold.

During the period of its travel that the mold is passing beneath the hopper 76 and the adjacent scraper members 91, the top of such mold is open but in order to properly form the brick within the mold it is necessary, as is believed to be obvious, that such upper face of the mold be closed, and, as herein illustrated, I accomplish this function through the medium of the slide or movable pallet 122 which is adapted for controllable recurrent travel substantially radial of the mold frame, and, as herein set forth, the shelf or platform 8 to either side of the mold is provided with the transversely directed grooves or channels 123 adapted to afford a run-way for the tracks 124 depending from the under surface of such slide or pallet 122, such tracks 124 projecting, as indicated at 125, a predetermined extent in advance of such slide or pallet 122, for a purpose which will be hereinafter more particularly referred to. It is also to be observed that depending rearwardly of the mold and in alinement with the marginal portion thereof are the parallel runways 126 which in addition to the spoke 9 positioned intermediately thereof, are adapted to serve as a support for such slide or pallet 122 when the same is adjusted rearwardly of the mold in order to have the upper face thereof open. The inner end portions of such run-ways 126 are suitably secured to an annular member 127 concentric to the shaft 3 and suitably connected with the spokes 9. The slide or pallet 122 is normally maintained out of engagement with the run-ways 126 and the side marginal portions of the mold through the medium, as herein disclosed, of the flat springs 128 secured at one end to the under surface of such slide or pallet 122 at the ends thereof and adjacent the forward side thereof, with the free end portions adapted to contact with such run-ways 126 or side marginal portions of the mold. This normal position of the slide or pallet 122 is provided so as to avoid any interference being given to its recurrent movement by the material within the mold.

When the slide or pallet 122 has been adjusted in such position as to close the top face of the mold, it is necessary that the same be locked in such position during the period of pressure created by the head or block 26 and in the present embodiment of my invention, I accomplish this purpose by having the tracks 124 provided with the inwardly directed flanges 129, the upper surfaces 130 of which are inclined or beveled longitudinally and outwardly thereof, which inclined or beveled surfaces are adapted to coact with correspondingly beveled or inclined upper walls 131 of a groove or channel 132 produced in the inner walls of the grooves or channels 123 and into which the flanges 129 project. By this arrangement, it is thought to be obvious that at the time the pallet or slide 122 is at the limit of its outward adjustment the coacting inclined or beveled surfaces 130 and 131 will cause such slide or pallet to bear tightly against the mold and effectively withstand the pressure created by the head or block 26. While the recurrent movement of the slide or pallet 122 may be accomplished as desired, I find it of advantage to employ the mechanism illustrated in the accompanying drawings, wherein a cam element 133 is immovably positioned above the mold frame at its axial center and, as herein set forth, such cam element is provided at its center with the opening 134 angular in cross section which is adapted to accommodate the upper end portion 135 of the shaft 3 of similar configuration in cross section whereby it will be readily perceived that the cam element 133 is effectively held against rotation. To further support the cam element 133 in its operative position, I employ, as set forth in the present embodiment of my invention, the beam 136 having one end portion suitably secured to the cam element while the opposite end portion is suitably anchored to the supporting frame 73. The cam element 133 is provided with a cam race 137 adapted to accommodate an anti-fraction member or roller 138 disposed to one side of and operatively carried by a link 139, which link is in pivotal engagement, as indicated at 140, with the inner extremity of an arm 141 which has its outer end portion bifurcated in substantially a horizontal plane, as indicated at 142, and adapted to bridge or straddle a buffer head or block 143 and pivotally engaged therewith, as at 144, while the opposite end portion of such link 139 is in pivotal engagement with a lug 155 suitably supported by an adjacent spoke 9. The buffer block or head 143 is mounted for sliding movement on the headed members 145 projecting rearwardly of such slide or pallet 122 and interposed between such buffer block or head and the adjacent edge or surface of the slide or pallet and surrounding the shanks of such headed members 145 are the expansible members 146, herein disclosed as in the nature of coil springs. By this arrangement, it will be perceived that any possible shock that might be encountered by the slide or pallet 122 in its rearward movement is readily and conveniently absorbed or compensated for.

The cam race 137 is so disposed that at the time the mold is about passed from beneath the hopper 76 and the scraper members 91 and as indicated at $b$ in Fig. 1, as to impart such movement to the arm 141 through the medium of the link 139 as to adjust the slide or pallet 122 above the mold, as has hereinbefore been set forth, such position being attained at a time slightly in advance of the upward operation of the head or block 26 as created by the low point $a$, as hereinbefore recited. The cam race 137 is disposed, as indicated at $c$ in Fig. 1, concentric with the shaft 3 to such an extent as to maintain the slide or pallet 122 in its outward adjustment until recurrent operation of the head or block 26 has been substantially completed, whereupon such cam race is disposed, as indicated at $d$ in Fig. 1, to withdraw the slide or pallet 122 from above the mold so that the molded or compressed brick may be ejected. The remaining portion of the cam race is disposed, as indicated at $e$ in Fig. 1, concentric to the shaft 3 and spaced relatively thereto so as to maintain such slide or pallet 122 in its retracted position. At substantially the moment the slide or pallet 122 is retracted from above the mold, the pallets 68 are caused to travel upwardly so that the molded or compressed brick will be elevated free of the mold so that the same may be withdrawn from the machine with facility and in the present embodiment of my invention this movement of each of the pallets 68 is accomplished through the medium of a trigger 147 mounted for rocking movement within a slot 148 suitably produced in the concaved upper surface of the head or block 26 and normally maintained in contact with the base thereof. As herein disclosed, such trigger 147 has its outer end fixed to a rock shaft 149 suitably mounted on such head or block 26 and being provided with the outwardly directed rock arm 150 having suitably mounted on its free end portion the anti-friction member or roller 151 adapted to contact with the under surface of the cam rail 152 whereby such shaft 149 will be moved as to cause the trigger 147 to impart such vertical movement to the coacting pallet 68 as to elevate the same substantially above the mold.

In order to facilitate the proper manipulation of the pallet 68, I find it of particular advantage to have depending from the under surface thereof the tongue 153 which is adapted to project within the slot 148 and to have its under edge engaged by the trigger 147, hereinbefore referred to. The trigger 147 is normally maintained in contact with the base of the slot 148 and as herein disclosed this normal position is maintained through the medium of the contractible member 154 secured to the rock arm 150 and to the adjacent side wall of the mold, such contractible member 154 being herein disclosed as a coil spring of requisite tension.

In order to afford a convenient means whereby the molded or compressed bricks may be handled by an operator, I have projecting from the periphery of the platform or shelf 8 in alinement with the mold a suitable frame 156 which is adapted to have rested thereon a suitable handling board or pallet 157, the upper face of which, when in applied position, is adapted to be substantially flush with the upper surface of the mold. This frame 156 in its details forms no particular part of my invention, as herein set forth, other than to state that a suitable means 158 is employed for holding the board or pallet 157 against displacement and, as herein disclosed, such means is shown as in the nature of a flat spring pivoted intermediate its length with its opposite extremities adapted to exert pressure against an adjacent edge portion of the board or pallet 157, whereby the same is effectively held in contact with the peripheral portion of the platform or shelf 8, as is believed to be fully disclosed in the accompanying drawings.

It is particularly desirable to employ automatic means for transferring the brick ejected from the mold upon the handling board or pallet 157, and, as herein disclosed, I accomplish this result through the medium of the head 159 normally maintained above the forward longitudinal marginal portion of the slide or pallet 122 and having a depending plate 160 which serves to determine the normal position of such head 159. Extending rearwardly from the head 159 and disposed perpendicularly thereto are the elongated arms 161 which are adapted to traverse through the guide blocks 162 whereby the movement of the head 159 is controlled.

It is the purpose of my present invention, as herein disclosed, to impart sufficient movement to the head or block 159 as to cause the same to travel entirely across the adjacent mold and to force the brick ejected therefrom, as has hereinbefore been set forth, upon the handling board or pallet 137 and, as herein embodied, the outward movement of the head 159 is accomplished through the medium of the cam element 163 of requisite configuration and with which the anti-friction member or roller 164 rotatably mounted above and carried by the arm 165 projecting rearwardly from the head 159 and substantially central of the arms 161 is adapted to contact. In order to regulate the outward travel of such head 159, I find it of advantage to have the cam element 163 capable of adjustment and, as herein illustrated, I accomplish this by having one end portion of such cam element 163 pivotally connected, as at 166, to the cam element 133, while the opposite or outer end portion of such cam element 163 is in pivotal engagement, as at 167, with an elongated link 168 which, in turn, has its opposite extremity in pivotal engagement, as at 169, with such cam element 133 and in order to permit an adjustment of the cam element 163 about its pivot 166, it is to be observed that the link 168 at its point of connection 169 is provided with an elongated slot 170 for a purpose and operating in a manner which is believed to be clearly apparent. The anti-friction member or roller 164 is maintained in proper engagement with the cam element 163 through the medium of the retractible member 171 anchored at one end to the head 159 and at its opposite end to the rear of the slide or pallet 122. As herein illustrated, the member 171 is directed beneath the arm 161 and for that purpose the under surface of the arm is provided with the elongated groove or channel 172 which is adapted to readily accommodate the outer end portion of such member 171. In order to further assure that a requisite amount of material has been deposited within a mold and to assure the upper surface of such material being evened, I provide the forward edge portion of the slide or pallet 122 with a scraping member 173, the end portions of which engage suitable trackways 174, such scraping member 173 being yieldingly maintained in position for contact with the marginal portions of the mold through the medium of the spring members 175, herein disclosed as in the nature of flat springs having their inner end portions suitably secured to the slide or pallet 122 while the outer or free end portions thereof bear against the upper edge portion of such member 173.

The extent of travel of the head or block 26 is controlled through adjusting the pivotal connection between the pitman 32 and the lever 33 and, as herein illustrated, this is accomplished by having such inner end of the pitman 32 bifurcated, as at 176, to bridge or straddle the intermediate portion of the lever 33, the forks afforded by such bifurcation 176 being provided with the open ended slots 177 adapted to accommodate the trunnions 178 formed on the clamping head 179 provided with an intermediate extension 180 adapted to be accommodated within an endwise directed longitudinal slot 181 produced in the lever 33. Coacting with the clamping head 179 is the clamping plate 182 through which is passed the threaded members 183 adapted for engagement with the extension 180, whereby it will be readily perceived that the pivotal connection afforded by the clamping head 179 or more particularly the trunnions 178 thereof may be readily and conveniently adjusted relatively to the lever 33 and effectively maintained in such adjustment. The slots 177 are closed by the bearing blocks 184 which are adapted to properly contact with the trunnions 178 and are effectively held against displacement from within the slots through the medium of the keys 185 suitably directed through alined openings in the forks of the bifurcation in a manner which is believed to be self-evident.

The manner for imparting axial or rotary movement to the mold frame as afforded by the shelves or platforms 7 and 8 and their concomitant parts may be accomplished in any manner as will operate with facility but I find it preferable that the periphery of the lower shelf or platform 7 be grooved as at 202 to accommodate a suitable belt 203 passed therearound and operatively engaged with a suitable source of power, indicated in the drawings at 186. While I do not wish to be understood as limiting myself to the use of a belt, I have found that by this arrangement the frame may be caused to rotate with greater advantage.

As is believed to be clearly apparent, the cam rail 152 is maintained stationary relatively to the mold frame and, as herein set forth, it is maintained in proper operative position through the medium of the brackets 187 suitably anchored to the foundation 1. I also find it of advantage to have the track 10 inclined downwardly and inwardly in transverse section and having the periphery of the wheels 11 correspondingly inclined, whereby it will be readily perceived that the mold frame is effectively maintained in proper position independently of the shaft 3. I also find it of advantage to provide the periphery of the upper shelf or platform 8 with the downwardly and outwardly directed flange or skirt 188 of such a length as to reduce to a minimum the possibility of any waste material which may drop from such upper shelf or platform in any way interfering with the travel of the mold frame.

While I do not wish to be understood as limiting myself to the particular manner in which the hub disks 5 are mounted upon the shaft 3, yet I find it of particular advantage to employ the arrangement particularly shown in Figs. 24 and 25 of the drawings wherein it will be seen that each of such disks 5 have their central portions clamped between the annular plates 189 through the medium of suitable retaining members 190, the bores of such plates 189 being in register with the bore of the disk, the wall 191 afforded by such bores being tapered in order to accommodate the correspondingly tapered sections 192, the upper marginal portions of such sections being provided with the flanges 193 through which pass the axially movable members 194, herein shown in threaded engagement, as at 195, with threaded recesses or apertures 196, whereby the sections 193 may be readily controlled to compensate for any wear that may be encountered by such sections 192 incident to the resultant friction thereof created by the rotation of the mold frame. I also find it of particular advantage to provide the auxiliary or feeding hopper 76 at its forward end with means to prevent the free passage with the mold frame of the material to be operated upon and, as herein set forth, I accomplish this purpose through the medium of the transversely disposed bar 197 adapted to be maintained in yielding engagement with the upper platform or shelf 8 through the medium of the spring members 198 positioned thereabove and in suitable contact therewith, such member 197 being maintained in operative relation through the medium of the headed members 199 suitably anchored in the adjacent end wall of the auxiliary or feeding hopper 76 and passed through the elongated vertically disposed slots 200. I also find it of advantage to have the lower marginal portion of such member 197 provided with the forwardly directed flange 201, whereby the same may serve as a convenient means for further assisting the proper distribution or evening of the material within the mold as it passes from beneath the auxiliary or feeding hopper 76.

In order to minimize any resultant friction, I find it of advantage to suitably mount within the opposed walls of the forks 58 the elongated anti-friction rollers 34$^a$ which are adapted to contact with the adjacent surfaces of the spoke or arm 9 passing therebetween and in order to afford an increased bearing surface for such rollers 34$^a$, I employ the block 9$^a$, as particularly shown in Fig. 7, suitably secured to the upper surface of such arm or spoke 9 and having its upper surface curved so that no obstruction will be offered thereby to the rocking movement of the lever 33. While I do not wish to be understood as limiting myself to this exact arrangement of parts, I have found in practice that better results may be obtained by the use thereof.

In order to control the extent of movement of the trigger 147 to compensate for the different sizes of brick that it is desired to elevate out of a mold, I find it of advantage to have the rock arm 150 composed of two sections pivotally engaged, as at 150$^a$, as particularly shown in Fig. 14, whereby it will be observed that the throw of the arm 150 by contact with the cam rail 152 may be conveniently and readily regulated to meet the requirements of practice.

From the foregoing description, it is thought to be obvious that a molding apparatus constructed in accordance with an embodiment of my invention is of an extremely simple and comparatively inexpensive nature and is particularly well adapted for use by reason of the automatic manner in which the various steps embodied in affording the product are operated and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

Having thus fully described my invention what I desire to claim and secure by Letters Patent, is:

1. A device of the character described including a mold having its upper face open, a pressure block mounted for recurrent movement within the mold, a slide capable of adjustment to close the open face of the mold, a pallet within the mold and rested upon the pressure block means for imparting reciprocatory movement to the slide whereby the same may be withdrawn to uncover the open face of the mold, the upper face of such compression block being provided with a recess, a trigger mounted for rocking movement within such recess, a tongue provided on the under surface of the pallet and adapted to project within the recess of the pressure block and with which the trigger is adapted to contact to elevate the pallet within the mold independently of the movement imparted thereto by the pressure block, and means for imparting movement to the trigger.

2. A device of the character described including a frame member mounted for axial movement, a plurality of molds carried by such member, delivery means discharging within such molds, a compression means coacting with each of the molds, and a downwardly and outwardly directed flange carried by the upper peripheral marginal portion of the frame member.

3. A device of the character described including a mold having its upper face open, a pressure block mounted for recurrent movement within the mold, a slide capable of adjustment to close the open face of the mold, a pallet within the mold and rested upon the pressure block, means for imparting reciprocatory movement to the slide whereby the same may be withdrawn to uncover the open face of the mold, a trigger mounted for rocking movement upon the pressure block and adapted to engage the under portion of the pallet, means for normally maintaining the trigger out of contact with the pallet, and means for imparting upward movement to the trigger independently of the movement of the pressure block to impart independent movement to the pallet.

4. A device of the character described including a mold, means for imparting movement thereto, said mold having its upper face open, a pressure block mounted for recurrent movement within the mold, a slide capable of adjustment to close the open face of the mold, a pallet within the mold and rested upon the pressure block, means for imparting reciprocatory movement to the slide whereby the same may be withdrawn to uncover the open face of the mold, means carried by the pressure block to elevate the pallet within the mold independently of the movement imparted thereto by the pressure block, and stationary means coacting with the last named means during movement of the mold for operating the same.

5. A device of the character described including a mold, means for imparting movement thereto, said mold having its upper face open, a pressure block mounted for recurrent movement within the mold, a slide capable of adjustment to close the open face of the mold, a pallet within the mold and rested upon the pressure block, means for imparting reciprocatory movement to the slide whereby the same may be withdrawn to uncover the open face of the mold, a trigger carried by the pressure block and adapted to contact with the pallet thereon to elevate the same independently of the movement imparted thereto by the pressure block, and a stationary member coacting with the trigger during the movement of the mold for operating said trigger.

6. A device of the character described including a mold having its upper face open, means for imparting movement to the mold, a pressure block mounted for recurrent movement within the mold, a slide capable of adjustment to close the open face of the mold, a pallet within the mold and rested upon the pressure block, means for imparting reciprocatory movement to the slide whereby the same may be withdrawn to uncover the open face of the mold, a trigger mounted for rocking movement upon said pressure block and projecting to one side of the mold, and a stationary cam adapted to coact with the trigger during the movement of the mold to impart movement to the trigger in one direction to elevate the pallet within the mold independently of the movement imparted thereto by the pressure block.

7. A device of the character described including a mold having its upper face open, a pressure block mounted for recurrent movement within the mold, a slide capable of adjustment to close the open face of the mold, a pallet within the mold and rested upon the pressure block, means for imparting reciprocatory movement to the slide whereby the same may be withdrawn to uncover the open face of the mold, and regulatable means carried by the pressure block to elevate the pallet within the mold independently of the movement imparted thereto by the pressure block.

8. A device of the character described including a mold having its upper face open, a pressure block mounted for recurrent movement within the mold, a slide capable of adjustment to close the open face of the mold, a pallet within the mold and rested upon the pressure block, means for imparting reciprocatory movement to the slide whereby the same may be withdrawn to uncover the open face of the mold, and means carried by the pressure block to elevate the pallet within the mold independently of the movement imparted thereto by the pressure block, said last named means including mechanism whereby the extent of elevation of the pallet may be varied.

9. A device of the character described including a mold having its upper face open, a pressure block mounted for recurrent movement within the mold, a slide capable of adjustment to close the open face of the mold, a pallet within the mold and rested upon the pressure block, means for imparting reciprocatory movement to the slide whereby the same may be withdrawn to uncover the open face of the mold, a trigger carried by the pressure block and adapted to contact with the pallet thereon to elevate the same, an extension carried by the trigger and comprising relatively adjustable sections, and means coacting with the extension for imparting requisite movement to the trigger.

10. A device of the character described including a mold having its upper face open, a pressure block mounted for recurrent movement within the mold, a slide capable of adjustment to close the open face of the mold, a pallet within the mold and rested upon the pressure block, means for imparting reciprocatory movement to the slide whereby the same may be withdrawn to uncover the open face of the mold, a head mounted for reciprocatory movement upon the slide and movable in a path over the open face of the mold, and means for imparting outward movement to the head independently of the slide after the slide has been withdrawn from above the mold.

11. A device of the character described including a mold having its upper face open, a pressure block mounted for recurrent movement within the mold, a slide capable of adjustment to close the open face of the mold, a pallet within the mold and rested upon the pressure block, means for imparting reciprocatory movement to the slide whereby the same may be withdrawn to uncover the open face of the mold, a head mounted for reciprocatory movement upon the slide and movable in a path over the open face of the mold, a rearwardly disposed arm carried by the head, and means coacting with said arm for imparting outward movement to the head when the slide is in withdrawn adjustment relative to the mold.

12. A device of the character described including a mold having its upper face open, a pressure block mounted for recurrent movement within the mold, a slide capable of adjustment to close the open face of the mold, a pallet within the mold and rested upon the pressure block, means for imparting reciprocatory movement to the slide whereby the same may be withdrawn to uncover the open face of the mold, a head mounted for reciprocatory movement upon the slide and movable in a path over the open face of the mold, means for imparting outward movement to the head independently of the slide after the slide has been withdrawn from above the mold, and means coacting with the slide and head for imparting movement to the head in an opposite direction.

13. A device of the character described including a mold having its upper face open, a pressure block mounted for recurrent movement within the mold, a slide capable of adjustment to close the open face of the mold, a pallet within the mold and rested upon the pressure block, means for imparting reciprocatory movement to the slide whereby the same may be withdrawn to uncover the open face of the mold, a head mounted for reciprocatory movement upon the slide and movable in a path over the open face of the mold, a rearwardly disposed arm carried by the head, and regulatable means coacting with said arm for imparting outward movement to the head when the slide is in withdrawn adjustment relative to the mold.

14. A device of the character described including a mold having its upper face open, a pressure block mounted for recurrent movement within the mold, a horizontally movable slide capable of adjustment to close the open face of the mold, yieldable means carried by the slide coacting with the mold for normally holding the slide out of contact therewith, and means for imparting reciprocatory movement to the slide whereby the same may be withdrawn to uncover the open face of the mold.

15. A device of the character described including a mold having one face open, a slide adapted for movement toward and from the mold and adapted to close the open face thereof when at the limit of its movement in one direction, headed elongated members projecting rearwardly from the slide, a buffer slidably engaged with such elongated members, expansible members interposed between the buffer and the adjacent extremity of the slide, and means coacting with the buffer for imparting reciprocatory movement to the slide.

In testimony whereof I hereunto affix my signature in the presence of two witnesses.

GEORGE EMORY HECKERT.

Witnesses:
 ADAM B. HECKERMAN,
 H. C. LIEBER.